(12) United States Patent
Lv et al.

(10) Patent No.: US 7,997,502 B2
(45) Date of Patent: Aug. 16, 2011

(54) TWO-DIMENSIONAL CODE AND ITS DECODING METHOD, AND THE PRINTING PUBLICATION USING THIS TWO-DIMENSIONAL CODE

(75) Inventors: Yingfeng Lv, Shenzhen (CN); Zhengfang Li, Shenzhen (CN); Wei Zhang, Shenzhen (CN); Guangyi Gu, Shenzhen (CN)

(73) Assignee: Shenzhen MPR Times Technology Co. Ltd, Shenzhen (CN)

( * ) Notice: Subject to any disclaimer, the term of this patent is extended or adjusted under 35 U.S.C. 154(b) by 216 days.

(21) Appl. No.: 12/300,542

(22) PCT Filed: Oct. 17, 2007

(86) PCT No.: PCT/CN2007/070917
§ 371 (c)(1),
(2), (4) Date: Nov. 12, 2008

(87) PCT Pub. No.: WO2008/058480
PCT Pub. Date: May 22, 2008

(65) Prior Publication Data
US 2009/0184171 A1    Jul. 23, 2009

(51) Int. Cl.
*G06K 19/06* (2006.01)
(52) U.S. Cl. ...................................................... 235/494
(58) Field of Classification Search .................. 235/494
See application file for complete search history.

(56) References Cited

U.S. PATENT DOCUMENTS

| | | | |
|---|---|---|---|
| 5,835,629 A * | 11/1998 | Seo ................................ | 382/173 |
| 6,408,106 B1 * | 6/2002 | Tatsuta et al. ................. | 382/287 |
| 6,993,211 B2 * | 1/2006 | Matsui et al. ................. | 382/321 |
| 2003/0112471 A1 * | 6/2003 | Damera-Venkata et al. | 358/3.28 |
| 2005/0258250 A1 | 11/2005 | Melick et al. | |

FOREIGN PATENT DOCUMENTS

| | | |
|---|---|---|
| CN | 1645136 A | 7/2005 |
| CN | 1801188 A | 7/2006 |
| CN | 1963843 A | 5/2007 |

OTHER PUBLICATIONS

International Search Report for PCT/CN2007/070917 dated Jan. 31, 2008.

* cited by examiner

*Primary Examiner* — Daniel A Hess
*Assistant Examiner* — David Tardif
(74) *Attorney, Agent, or Firm* — Pearne & Gordon LLP

(57) ABSTRACT

The invention discloses a two-dimensional code and its decoding method and the printing publication for applying the two-dimensional code. Positioning dots located at four corners of code symbols in the two-dimensional code are larger than data dots. The code symbols are arranged repeatedly on the basement, including at least two identical code symbols. Adjacent code symbols share same positioning dots on their adjacent border. The decoding method comprises the following steps: reading the two-dimensional code by using a reading device, detecting the margin of each dot, obtaining an image of the closed border, selecting positioning dots; matching the positioning dots in a rectangle mode, grouping the data dots, reconstructing a matrix of data dots, and reducing codes according to an inverse process of codes layout in coding process of the two-dimensional code.

7 Claims, 7 Drawing Sheets

| 8 | 1 | 2 |
|---|---|---|
| 7 | 0 | 3 |
| 6 | 5 | 4 |

TWO-DIMENSIONAL CODE AND ITS DECODING METHOD, AND THE PRINTING PUBLICATION USING THIS TWO-DIMENSIONAL CODE

FIELD OF THE INVENTION

This invention relates to a two-dimensional code, a decoding method thereof, and an application thereof in printing publication.

BACKGROUND OF THE INVENTION

Customarily people always read the traditional publication such as books, newspaper and so on with their eyes, which will be tired easily after a long time using, this way of getting information is rather boring, and it is impossible for a person who is blind or has eye disease. Thus the voice reading publication has appeared recently, which uses a two-dimensional voice reading device to decode the content of one book and pronounce, so that the readers can listen, improving the effect of reading or memory, it is also convenient for the blind or those who have eye disease.

Usually the main form of a two-dimensional code is plain code. On the voice reading publication, the reading apparatus can touch-read the two-dimensional code symbol that is printed clearly between words and paragraphs or some visible places on the page. This kind of plain code can only appear on the blank places of the page and usually in the form of single code, so the beauty of the page will be influenced more or less. And the plain code usually will be printed a little big so they can be found easily, although the requirement for printing precision is rather low, the head of the reading apparatus needs to be big for touch-reading.

On the market the two-dimensional code voice reading device has appeared and used the conventional two-dimensional code to mark phonetic places but its amount of the phonetic index is limited so that different publication needs using the same code, resulting in the mistakes of phonetic content, because the phonetic file of the reading device is corresponding to the target publication.

SUMMARY OF THE INVENTION

The objective of this invention is: providing a two-dimensional code and its decoding method adapted to store data, convenient for reading and having easy decoding algorithm, and the publication with the multimedia data index information using this two-dimensional code. The two-dimensional code was designed to meet the requirements of the conventional printing condition of the publication, so it is more convenient and reliable in use.

To achieve the object, this invention firstly discloses a two-dimensional code, wherein its code symbols comprise an array of bar code cells with different optical reflectance on a basement; wherein each code symbol is a rectangle, wherein the bar code cells in the symbol are solid dots arranged at equal intervals and the cells located at four corners of the code symbol are four positioning dots for defining and recognizing the border, the rest of the cells are data dots, the size of the positioning dots is larger than that of data dots, wherein a plurality of said code symbols are arranged repeatedly on the basement so as to be seamlessly joined as a code matrix, including at least two identical code symbols, wherein adjacent code symbols in the code matrix share the same positioning dots on their adjacent border, wherein the data dots are all within the rectangle defined by linking centers of the positioning dots, wherein the diameter of the positioning dots is twice the diameter of the data dots, and wherein the code symbol includes 10×10 bar code cells, except the positioning dot, every adjacent 8 data dots constituting a group to represent one code word; the coordinates of the positioning dot are respectively (0,0),(9,9),(0,9) and (9,9); in the chessboard coordinate system defined by coordinates of the positioning dots, the data dot are divided into 12 groups that respectively represent one code word; the unit coordinates of the first group include (1,0),(2,0),(0,1),(1,1),(2,1),(0,2),(1,2),(2,2); the unit coordinates of the second group include (3,0),(4,0), (5,0),(6,0),(3,1),(4,1),(5,1),(6,1); the unit coordinates of the third group include (7,0),(8,0),(7,1),(8,1),(9,1),(7,2),(8,2),(9,2); the unit coordinates of the forth group include (3,2),(4,2),(2,3),(3,3),(4,3),(2,4),(3,4),(4,4); the unit coordinates of the fifth group include (5,2),(6,2),(5,3),(6,3),(7,3),(5,4),(6,4),(7,4); the unit coordinates of the sixth group include (0,3),(1,3), (0,4),(1,4),90,5),(1,5),(0,6),(1,6); the unit coordinates of the seventh group include (8,3),(9,3),(8,4),(9,4),(8,5),(9,5),(8,6), (9,6); the unit coordinates of the eighth group include (2,5), (3,5),(4,5),(2,6),(3,6),(4,6),(3,7),(4,7); the unit coordinates of the ninth group include (5,5),(6,5),(7,5),(5,6),(6,6),(7,6), (5,7),(6,7); the unit coordinates of the tenth group include (0,7),(1,7),(2,7),(0,8),(1,8),(2,8),(2,9),(3,9); the unit coordinates of the eleventh group include (3,8),(4,8),(5,8),(6,8),(3,9),(4,9),(5,9),(6,9); the unit coordinates of the twelfth group include (7,7),(8,7), (9,7),(7,8),(8,8),(9,8),(7,9),(8,9).

Secondly, this invention provides a printing publication, printing with words and pictures for normal reading and the two dimensional code for recognition by a device.

Said code symbols can not be seen by eyes in normal reading environment, or compared with normal words and pictures, the said code symbols can not be seen easily.

Said bar code cells include deep color cells and light color cells representing respectively the values of binary system 1 and 0, and said light color cells can be shown directly by the background color of paper or other printing mediums.

The deep color cells of said code symbols are printed with infrared ink that shows different reflectivity to lights of infrared spectrum and show same reflectivity to lights of visible spectrum, while the other contents covering said code symbols use ink printing transmissive to lights of the infrared spectrum.

Information carried by the two-dimensional code includes the multi-media data index coding corresponding to different parts of said publication and the publishing species index coding of said publication.

The multi-media data index coding corresponding to the different parts of the publication and the publishing species index coding of said publication includes 6 functional sections consisting of fixed length of digit numbers: language number, classification number, class index number, page sequence number, code sequence number and error check number; wherein the language number is the digit code name of language stipulated by the language kinds of the publication; classification number is the digit code name of publication classification with some language according to the book species; class index number represents the concrete order of some classified book of the publication with some language, that can be numerical order; the page sequence number is the content of index coding according to the page digit of the publication; code sequence number is the number according with the number of two dimensional code and marking sequence used in the pages including two dimensional code; error check number is to check the correct errors of the index coding.

The multi-media data index coding corresponding to the different parts of the publication and the publishing species index coding of said publication includes 16-digit decimal number, wherein the length of every functional section is respectively: language number 1bit, classification number 2 bits, class index number 6 bits, page sequence number 4 bits, code sequence number 2 bits and error check number 1bit. The value of the publishing species index coding and the parity bit of the multi-media data index coding are calculated by the preceding 15 decimal numbers of the coding, calculation method: respectively and in sequence putting the preceding 15 decimal numbers from the multi-media data index of publication as the cardinal number, "1" and "2" as weighted factors, and respectively multiply with decimal number of cardinal number, and then product sum is divided by modulus 10, wherein every section of cardinal number multiplies with weighted factor, if the product is more than 10, then to add the tens digit of this product with single digit together to get every product sum, when every product sum is less than 10, to add 10 to the product sum and then be divided by modulus 10, and the difference between its remainder and 10 is the value of parity bit.

Thirdly, this invention provides a decoding method of the two-dimensional code including the following steps:

1) reading the code symbols by using a reading device, getting a gray code symbol image;

2) binarizing the gray code symbol image and get a binary image;

3) parsing the binary image, detecting the margin of each dot to obtain the dot images having margin;

4) parsing the dot image having margin to track their closed borders and discarding all the non-closed borders to obtain an image of the closed borders;

5) parsing the image of the closed borders, computing the area within every closed border in order to select the positioning dots;

6) matching the positioning dots in a rectangle mode to select one single image of the code symbol;

7) grouping the data dots from the image of the code symbols;

8) reconstructing a matrix of data dots; and 9) reducing codes according to an inverse process of codes layout in a coding process of the two-dimensional code.

The process of selecting positioning dots in said step 5) includes:

51) computing an area within every closed border so as to count an area histogram within all closed borders and finding an most concentrated area value $S_0$ from the area histogram;

52) defining the closed borders whose area is around $S_0$ and in compliance with a regulated error range as the data dots; and defining the closed borders having an area of a known multiple of $S_0$ and in compliance with a regulated error range as the positioning dots.

When the known bar code cells are circular dots, the method further includes, before the step 5, step 5') a process of recognizing the circular dots, comprising:

51') adding the pixel abscissa of all the border dots of each closed border, and then dividing the cumulative total of the pixel abscissa by the sum of border points to get the pixel abscissa u of the center point of the closed border; adding the pixel ordinate of all the border points, and then dividing the cumulative total of the pixel ordinate by the sum of border points to get the pixel ordinate v of the center dot of the closed border;

52') according to the pixel coordinates (u, v) of the center dot of the closed border, finding the diameter of the closed border in four directions to get four length values respectively d1, d2, d3, d4;

53') calculating the average diameter d=(d1+d2+d3+d4)/4, and defining the round's standard degree N=|d−d1|/d+|d−d2|/d+|d−d3|/d+|d−d4|/d;

54') calculating the value N of each closed border, discarding the closed borders having a value N greater than the setting threshold value $T_n$ according to actual statistic results, and considering the rest of the closed borders as the borders of bar code circular dots.

The process of matching the positioning dots in the rectangular mode in the said step 6) includes:

61) choosing the closest positioning dot to the center of image as a first reference dot;

62) choosing the other closest positioning dot to the first reference dot as a second reference dot;

63) using the side defined by the two reference dots as a reference border of a target rectangle, the first reference dot as the origin, and calculating the second reference dot's polar coordinate $(r_0, \theta_0)$;

64) calculating the rest of the positioning dots' polar coordinates $(r_i, \theta_i)$ relative to the first reference dot's polar coordinates, i∈[1~n], wherein n is the sum of positioning dots;

65) using the first reference dot as a center, relative to the reference side, calculating the polar coordinates of the other positioning dots of four rectangles of possible four code symbols;

$P_1=(r_0,\theta_0)$, $P_2=(r_0*1.414,\theta_0+45), P_3=(r_0*1,\theta_0+90)$ $P_4=(r_0*1.414,\theta_0+135)$ $P_5=(r_0*1,\theta_0+180)$ $P_6=(r_0*1.414,\theta_0+225)$ $P_7=(r_0*1,\theta_0+270)$ $P_8=(r_0*1.414,\theta_0+315)$ wherein: $P_0$ is the first reference dot, $P_1$ is the second reference dot, the angle of all the polar coordinates is in [0,360];

66) finding the matching polar coordinates from $P_1$ to $P_8$ in the calculation result of Step 64), determining if the matching of dots $P_0$, $P_1$ and $P_2$, $P_3$ will compose the first target rectangle, if the matching is not successful, then determining if the matching of dots $P_0$ and $P_3$, $P_4$ and $P_5$ will compose the second target rectangle, if still not successful, then determining if the matching of dots $P_0$ and $P_5$, $P_6$ and $P_7$ will compose the third target rectangle, if not successful again, then determining if the matching of dots $P_0$, $P_1$ and $P_8$, $P_7$ will compose the fourth target rectangle; if still can not be matched, then the decoding fails.

The grouping process of the data dots in said step 7) includes:

71) defining a closed quadrilateral according to the coordinates of four positioning dots, and 72) judging whether the data dots are within the quadrilateral or not, and the data dots within the quadrilateral belonging to the current code symbol.

The process of reconstructing the data dots' matrix in said step 8) includes:

81) setting unit module coordinates of four positioning dots, and then setting chessboard coordinates of each bar code cell; and 82) according to coordinate correcting formula, calculating the corresponding coordinates of the bar code chessboard according to the center coordinates of each data dot.

This invention provides the following advantageous effects by using the above technology solution:

The two-dimensional code of this invention uses the positioning dot having an area greater than that of the data dot at the four corners of the code symbol, and the array of the code symbol has the same positioning dot, without the requirement of two-dimensional code for quiet zone. The same code can be printed repeatedly and seamlessly jointed as a code matrix, so it is very convenient to gain code. The decoding calculation of the bar code is simplified and the code can be printed more closely and smaller to improve the coding efficiency. The two-dimensional code of this invention does not need to be seen clearly by eyes and does not need to occupy empty page, so it will not affect the printing and typesetting of the publication and be convenient for using. The application of the two-dimensional code of this invention is very easy and it is quick to read data, highly reliability and low bit error rate. The requirement for device is simple, which is beneficial for popularization and application.

The publication using the two-dimensional code of this invention can be read by a reading apparatus conveniently because of the large printing area using the same code with repetition array, and without the action "focus on", the reading apparatus can be placed freely but always in the range of code. When using repeated large area printing, if the words cover the alignment area of the two-dimensional code, some two-dimensional code can be exposed totally between the words and paragraphs; or using different ink to let the reading apparatus produce perspective effect on the printing content covering the bar code so that the two-dimensional code can be read conveniently.

Because the two-dimensional code of this invention can non-repeatedly encode all the voice index number of the whole publication, the publication using this kind of two-dimensional code totally possesses the quantity condition to become a new kind of publication. As the decoding algorithm computation is small, and the decoding time is shorter, the low-cost hardware can be used to reduce the cost of publication with the two-dimensional code of this invention. The unit module of the two-dimensional code is in two colors, so the bar code can assure the legibility only if there is enough difference between the foreground color and background color's brightness value; the background color can directly use the ground color of paper or other printing media to reduce the printing cost.

DETAILED DESCRIPTION OF THE PREFERRED EMBODIMENT

Embodiment of the invention will now be described with reference to the accompanying figures.

The two-dimensional code of this invention, its bar code cell of the code can use circular dot or the solid dots in other shape. Every black dot represents a bar code cell, every corresponding white dot also is a bar code cell, if the value of the black dot is 1, then the value of the white dot is 0, and vice versa. The white dot needs not be printed, but may directly use the ground color of the printing mediums such as paper and so on.

The diameter of the black dot needs to be big enough and the specific printing should base on the printing machine. RS coding is used to assure enough error correcting capability. The decoding computation is small, so it is convenient for the low-cost MCU operation.

The two-dimensional code of this invention can be printed as hiding code that you can not see the code symbol under the light except using special equipment or specific light. The two-dimensional code of this invention also can support plain code that is easy to find by eyes, because the hiding code can be amplified to print, or be arranged in the arrays (equivalent to the size of the words) and enlarge the black dot. When printing with plain code, the multi-code arrangement can reduce the requirement of "focus on". The total side length of the code needs to be as small as possible.

Figure 1:
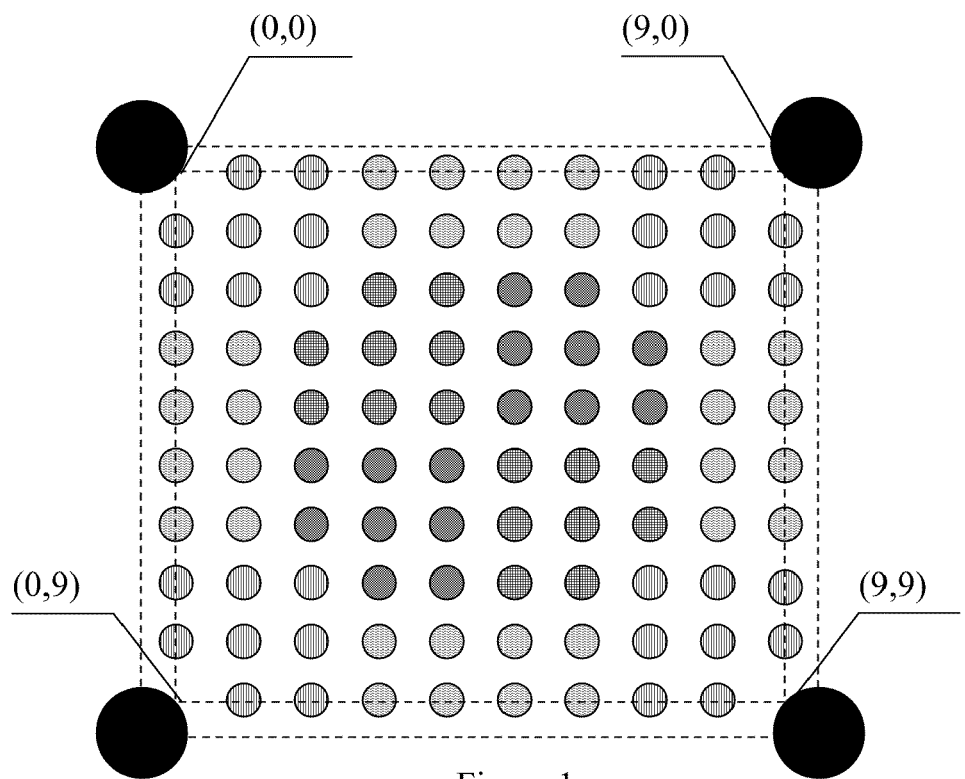
FIG. 1 is the schematic diagram of a single code symbol of this invention.
Figure 2:
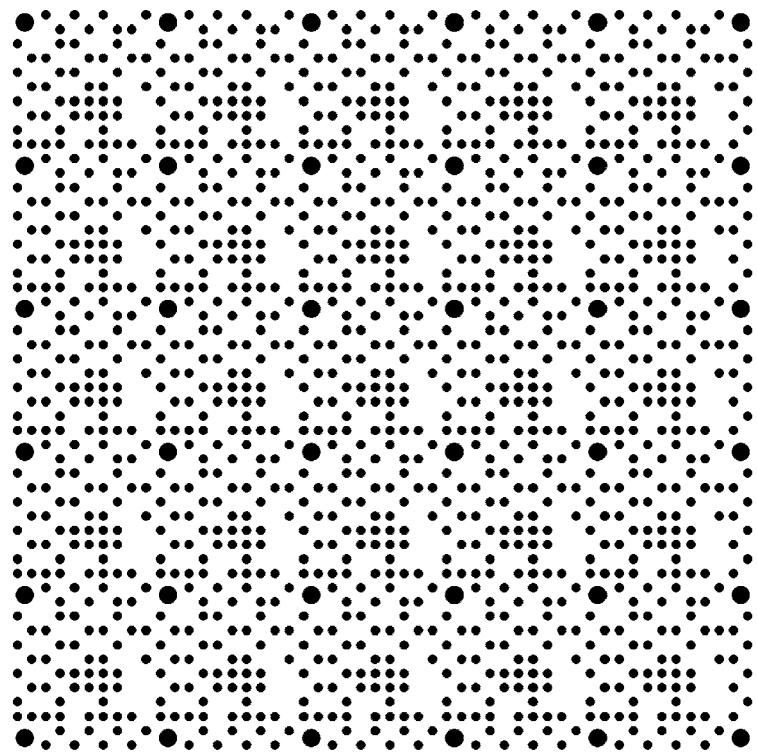
FIG. 2 is the schematic diagram of multi-code adjacent repeated arrangement of this invention.

According to FIG. 1 and FIG. 2, FIG. 1 is the schematic diagram of single code symbol of this invention, and FIG. 2 is the schematic diagram of multi-code adjacent repeated arrangement of this invention. The big black dots at the four corners of the code symbol in FIG. 1 is the recognition and positioning characteristic, the small circle dot is the bar code cell to represent data, the diameter of the big circular dot can be twice that of the small circular dot, the big circular dot is always deep color, the deep color of the small circular dot represents 1, and the light color represents 0; every 8 adjacent circular dots marked the same kind image represent one code word, one code symbol possesses 12 code words, respectively be marked code word 1~code word 12 from left to right and from up to down. The code word, the coordinate of the code word in the symbol and the bit sequence arrangement of the code word are all defined as the following layout chart of code word:

| Layout of code words | |
|---|---|
| Sequence number of code word | Coordinates of the code word in the symbol is (x, y) and the bit sequence arrangement (bit 7~bit 0) |
| 1 | (1, 0), (2, 0), (0, 1), (1, 1), (2, 1), (0, 2), (1, 2), (2, 2) |
| 2 | (3, 0), (4, 0), (5, 0), (6, 0), (3, 1), (4, 1), (5, 1), (6, 1) |
| 3 | (7, 0), (8, 0), (7, 1), (8, 1), (9, 1), (7, 2), (8, 2), (9, 2) |

-continued

Layout of code words

| Sequence number of code word | Coordinates of the code word in the symbol is (x, y) and the bit sequence arrangement (bit 7~bit 0) |
|---|---|
| 4 | (3, 2), (4, 2), (2, 3), (3, 3), (4, 3), (2, 4), (3, 4), (4, 4) |
| 5 | (5, 2), (6, 2), (5, 3), (6, 3), (7, 3), (5, 4), (6, 4), (7, 4) |
| 6 | (0, 3), (1, 3), (0, 4), (1, 4), (0, 5), (1, 5), (0, 6), (1, 6) |
| 7 | (8, 3), (9, 3), (8, 4), (9, 4), (8, 5), (9, 5), (8, 6), (9, 6) |
| 8 | (2, 5), (3, 5), (4, 5), (2, 6), (3, 6), (4, 6), (3, 7), (4, 7) |
| 9 | (5, 5), (6, 5), (7, 5), (5, 6), (6, 6), (7, 6), (5, 7), (6, 7) |
| 10 | (0, 7), (1, 7), (2, 7), (0, 8), (1, 8), (2, 8), (2, 9), (3, 9) |
| 11 | (3, 8), (4, 8), (5, 8), (6, 8), (3, 9), (4, 9), (5, 9), (6, 9) |
| 12 | (7, 7), (8, 7), (9, 7), (7, 8), (8, 8), (9, 8), (7, 9), (8, 9) |

The coding capacity of one code symbol including 12 bytes can rationally distribute the length of the data code and error correcting code. The same code is repeatedly arranged in the horizontal and vertical direction to improve the hitting rate, the adjacent two codes share two big positioning circular dots to produce seamlessly jointed code and improving the area efficiency to the maximum extent.

Figure 3:
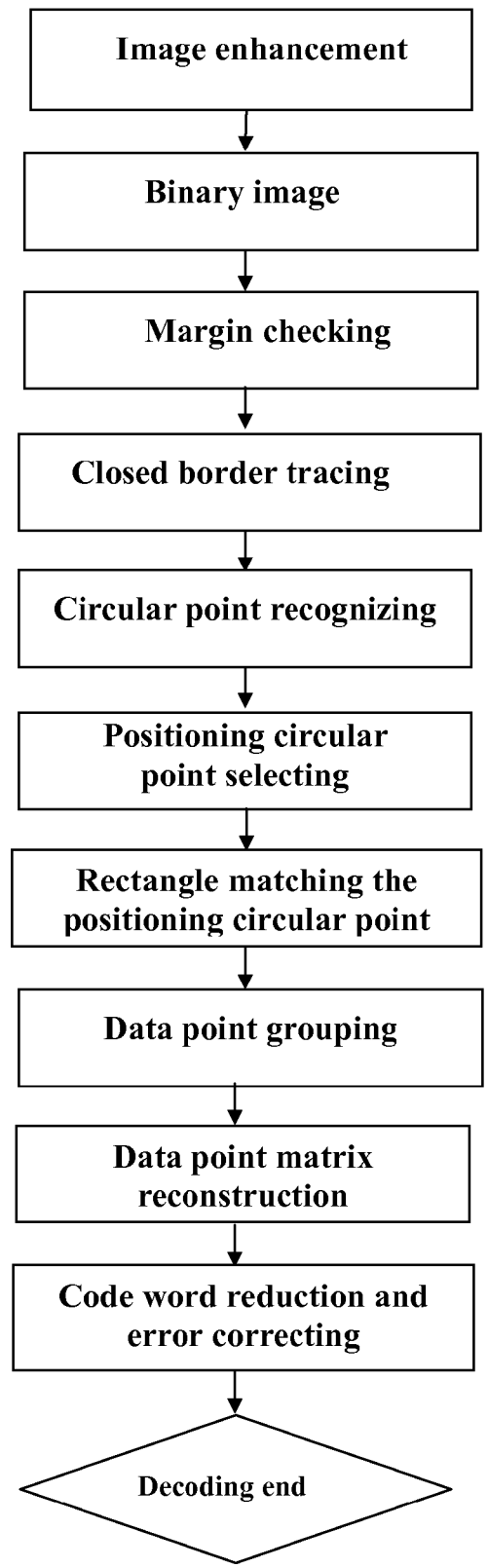
FIG. 3 is the decoding flow chart of the two-dimensional code of this invention.

The decoding is started after the image of the two-dimensional code symbol of this invention is obtained. For example, refer to the decoding flow chart of FIG. 3, the specific steps include: image enhancement, binary image, margin checking, closed border tracing, circular dot recognizing, positioning circular dot selecting, rectangle matching the positioning circular dot, data dot grouping, data dot matrix reconstruction, and error correction and reduction of the code word.

The following is the detailed decoding process:

1. Image Enhancement

Figure 4:
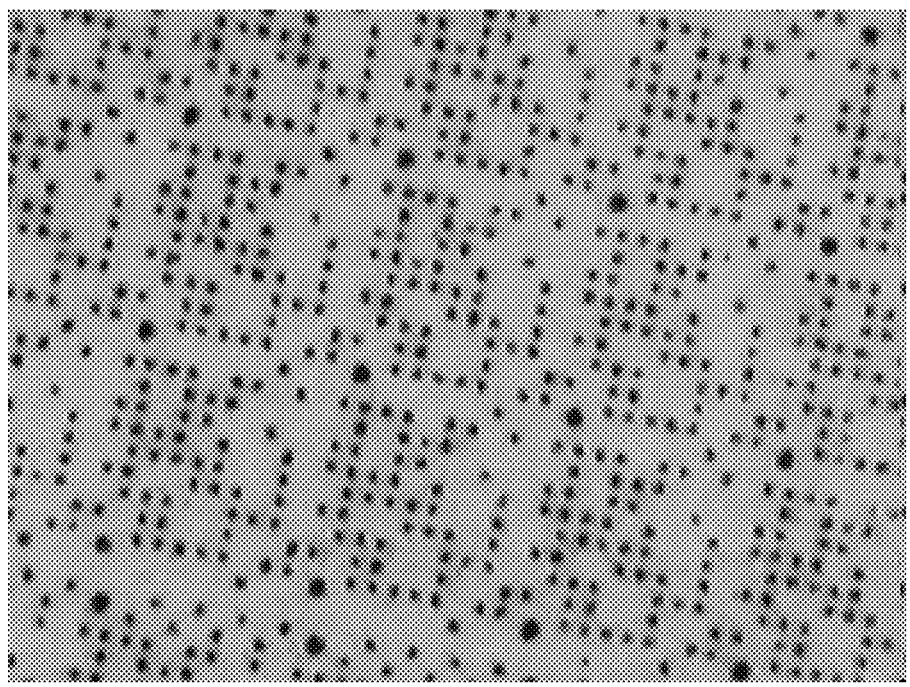
FIG. 4 is the original image of the two-dimensional code of this invention achieved by using the reading apparatus.
Figure 5:
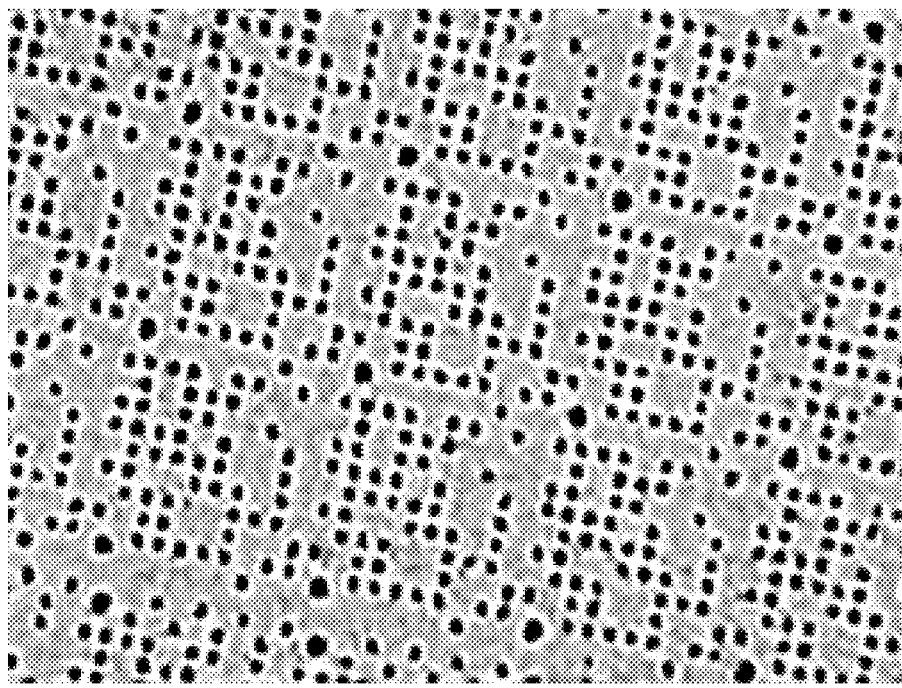
FIG. 5 is the enhanced image of the original image of the FIG. 4.

If it is in demand, image enhancing is performed on the original image of FIG. 4 to improve the recognition rate of the code and then produce the image enhancement of FIG. 5. The algorithm of the image enhancement can use USM (Unsharp Mask) that is familiar to persons in the digital image processing field, the principle is first to deal with the original image by two-dimensional gauss low-pass and then get the blurry image, then reduce this blurry image from the original image to get the image with enhanced contrast ratio. Suppose the original image is F(x, y), then the enhancement image is $V(x, y)=F(x, y)+K\times(F(x, y)-U(x, y))$, wherein K is the intensification factor, the empirical value is 1~4, and the enhancement effect is more distinct when K is greater, but the noise also will be enlarged in the image.

2. Binarizing

Binarizing is performed on the enhancement image, a threshold value T is set (0<T<255), the brightness of pixel higher than T is white, other pixels are black because dynamic range of the pixel luminance value is enlarged after the image enhancement, background brightness approaches to the maximum value 255, the pixel brightness composing the circular dot approaches to the minimum value 0, thus it is very easy to choose a fixed or dynamic threshold value T. The image of FIG. 6 can be obtained after being binarized.

3. Margin Checking

Figures 6, 7:
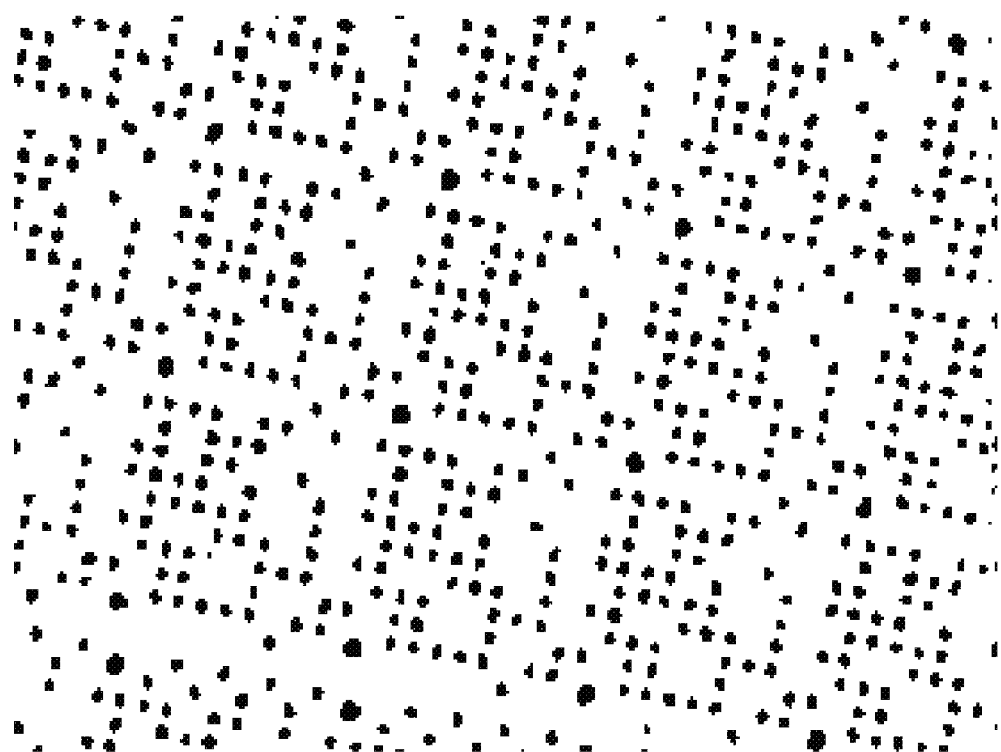
FIG. 6 is the binary image of the original image of the FIG. 5.
FIG. 7 is the definition schematic diagram of the adjacent pixel of some pixel in border check.

Margin check the binary image, the definition of margin pixels is: the pixel having a value 0 and the adjacent 8 pixels including a non-zero pixel. The adjacent pixel's definition of some pixel is as shown in FIG. 7; the pixel with code 0, the code of its adjacent 8 pixels is respectively from 1 to 8.

Figure 8:
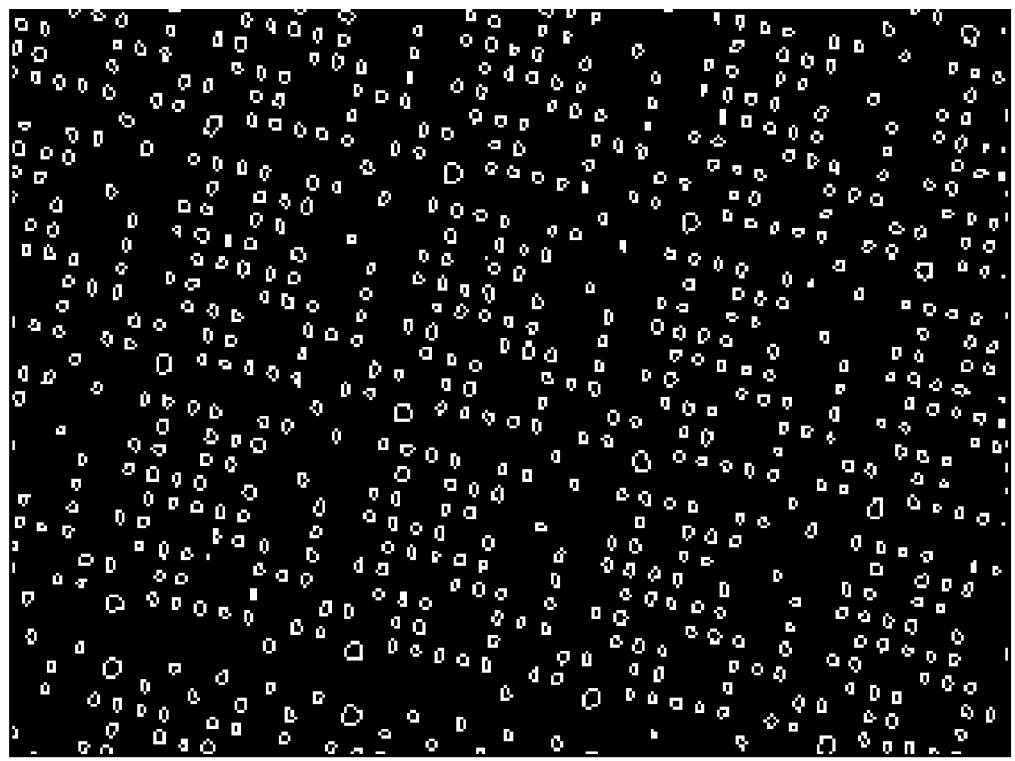
FIG. 8 is the border image when border checking the binary image of FIG. 6.

Mark the maximum brightness 255 if one pixel is margin pixel, otherwise mark 0. Margin check all the pixels in the binary image can get the margin image as shown in FIG. 8.

4. Closed Border Tracing

The object of closed border tracing is the margin image produced from the margin checking of the last step, including the following steps:

A) scanning the margin image by the main direction of a row (i.e. from the left to right, from the up to down), the first margin pixel gained by scanning as the starting pixel of the border tracing, this process ends if there is no margin pixel;

B) putting the coordinates of the starting pixel into the queue Q and mark the starting pixel as 0 to represent that it has been traced;

C) judging whether the adjacent 8 pixels of the starting pixel have margin pixel or not, if yes, then freely choosing one pixel as the starting dot for next tracing and jump to last step B; if not, this tracing ends, the coordinate list in the queue Q will be a closed border, that is the border of candidate targeted circular dot, storing the coordinate list of the queue Q and empty it, then jumping to step A.

The border of the circular dot image has been all checked after this process ends, and the check result is mixed into some noise black dot at the same time.

5. Circular Dot Recognizing

Figure 9:
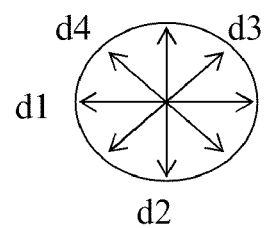
FIG. 9 is the schematic diagram to calculate the round's standard degree of the closed border image.

The aim of this step is to eliminate some noise data from the checking result of the Step 4, that is to give up the non-circular closed border, and the judgment basis of noise data is the circular geometric feature. If the code symbol uses the two-dimensional code of this invention and its cell is the solid dot with other sizes, then do not implement this step. As shown in FIG. 9, to one closed border, firstly add the abscissa of all the border dot and then the accumulative total is divided by the total amount of border dot to get center dot's abscissa u of the closed border, and then add the ordinate of all the border dots, the accumulative total is divided by the total amount of border dot to get center dot's ordinate v, the center dot's coordinate of the closed border is used to scan the diameter of closed border in the four directions, thereby respectively getting four length values d1,d2,d3,d4, suppose the average diameter is $d=(d1+d2+d3+d4)/4$, define the round's standard degree $N=|d-d1|/d+|d-d2|/d+|d-d3|/d+|d-d4|/d$. When the value of N is smaller, the reliability that the closed border is round is higher. Calculate the value of N to every closed border, discard the closed border having the value of N than a threshold value $T_n$, other closed borders are considered as the borders of bar code circular dots.

6. Positioning Circular Dot Selecting

Figure 10:
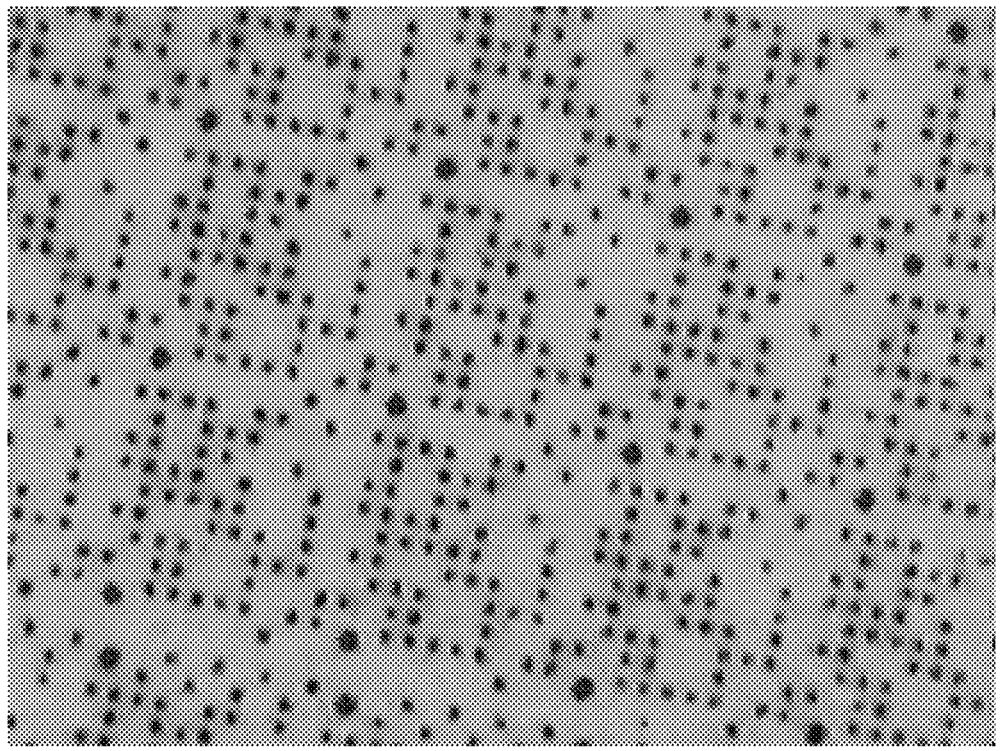
FIG. 10 is the schematic diagram about the result of selecting the positioning dots in the decoding process.
Figure 11:
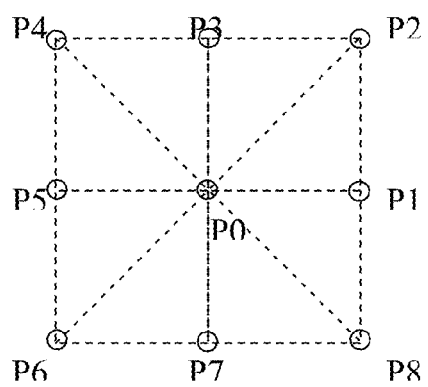
FIG. 11 is the schematic diagram of the rectangle matching the positioning circular dots in the decoding process.
Figure 12:
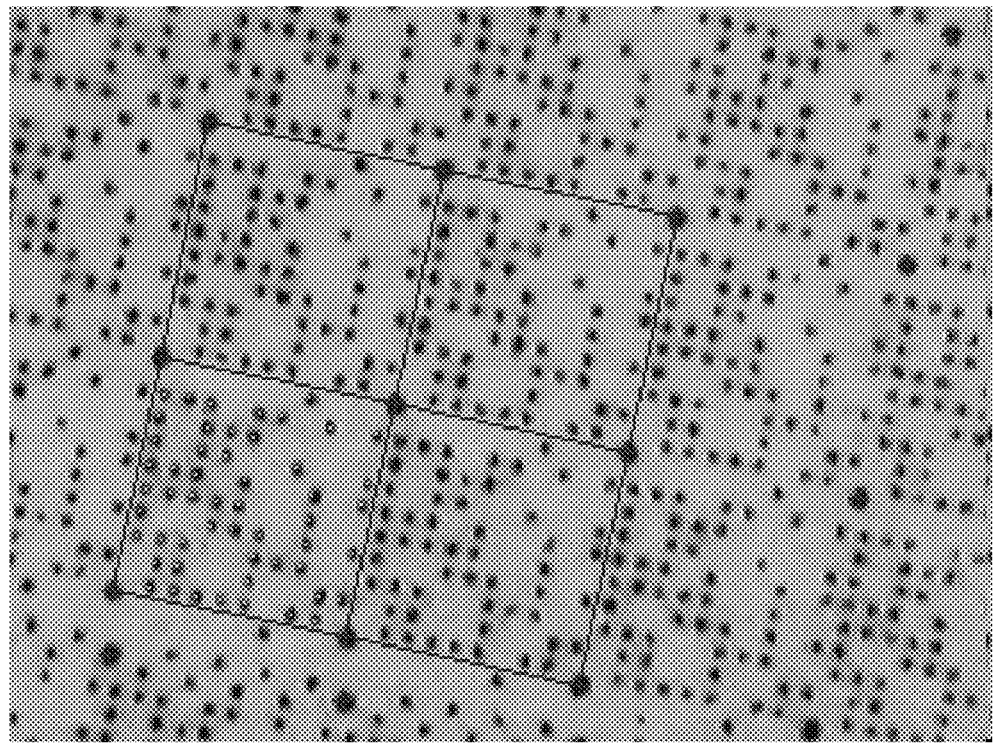
FIG. 12 is the schematic diagram about the rectangle matching result of the positioning circular dots.

This process selects the positioning circular dot from the circular dots that have been recognized. Please refer to FIG. 10, firstly count the histogram of circular dot's area to find area value $S_0$ of the most centralized distributed area histogram, and the range with the $S_0$ as the center is corresponding to the area of data circular dot, and the area of positioning circular dot is in the range with the $4*S_0$ as the center. According to this, the area histogram is divided into two parts, one part corresponding to data circular dot, one part corresponding to the positioning circular dot. This kind of calculation based on the count is steady because there are 96 data dots in one code symbol, according to the statistical value the amount of deep color circular dots is 48, so the area histogram can not have the unstable statistical result caused by too small amount of the circular dots.

If the code symbol uses the two-dimensional code of this invention, its cell is the solid dot in non circular shapes, when implementing this step, firstly calculate the area within every closed border and then count the histogram of every closed border area, find the area value $S_0$ of the most centralized distributed area histogram, and that corresponding to one range with the $S_0$ as the center is the area of data circular dot, and the area of positioning dot is several times that of that data dot, and this multiple can be defined according to the size of positioning dot and data dot determined previously. According to this extracting two parts from the area histogram, one part corresponding to data circular dot with $S_0$ as the center, one part corresponding to positioning circular dot with the several times of $S_0$ as the center. This method judges the noise data according to the area size of closed border, some closed border with too big or too small areas without statistic characteristic will be discarded.

7. Rectangle Matching the Positioning Circular Dot

Four positioning circular dots define one independent code symbol, and this process determines which positioning circular dots define the code symbol according to the precondition that the positioning circular dots at the four corners of every code compose one rectangle.

The process is as follows:

a) choosing the closest positioning dot to the center of image as a first reference dot;

b) choosing the other closest positioning dot to the first reference as a second reference dot;

c) the side defined by the two reference dots is the reference border of target rectangle, the first reference dot as the origin, calculating the second reference dot's polar coordinate $(r_i, \theta_0)$;

d) calculating the first reference dot's polar coordinate $(r_i, \theta_i)$ relative to the rest positioning dots, i∈[~n], is the sum of positioning dots;

e) using the first reference dot as center, relative to the reference side, to calculate polar coordinate of the other positioning dots about the contour-rectangle of possible four code symbols;

$$P_1 = (r_0, \theta_0),$$

$$P_2 = (r_0 * 1.414, \theta_0 + 45), P_3 = (r_0 * 1, \theta_0 + 90)$$

$$P_4 = (r_0 * 1.414, \theta_0 + 135)$$

$$P_5 = (r_0 * 1, \theta_0 + 180)$$

$$P_6 = (r_0 * 1.414, \theta_0 + 225)$$

$$P_7 = (r_0 * 1, \theta_0 + 270)$$

$$P_8 = (r_0 * 1.414, \theta_0 + 315)$$

Wherein: $P_0$ is the first reference dot, $P_1$ is the second reference dot, and the angle of all the polar coordinates is in [0,360];

f) finding the matching polar coordinate from $P_1$ to $P_8$ in the calculation result of Step d), the matching dots $P_0$, $P_1$ and $P_2$, $P_3$ compose the first target rectangle, $P_0$ and $P_3$, $P_4$ and $P_5$ compose the second target rectangle, the matching dots $P_0$ and $P_5$, $P_6$ and $P_7$ compose the third target rectangle, the matching dots $P_0$, $P_1$ and $P_s$, $P_7$ will compose the fourth target rectangle 8. Data Dot Grouping After the four positioning circular dots of the code have been confirmed, using four coordinates of the positioning circular dot to define a closed quadrangle; data dot within the quadrangle belongs to the data dot of the current code. Judging whether one dot is within the quadrangle can be implanted by judging whether one dot is within the two opposite edges of the quadrangle in twice, the judging method is:

Suppose the linear equation of the two sides is: $y = k_1 * x + b_1$; $y = k_2 * x + b_2$; the condition of dot $(x_0, y_0)$ is within the two sides:

$$(k_1 * x_0 + b_1 - y_0) * (k_2 * x_0 + b_2 - y_0) < 0.$$

9. Data Dot Matrix Reconstruction

Suppose the nominal coordinate of the positioning dot at the four corners of the bar code is respectively (0,0), (20,0), (0,20) and (20,20); according to the coordinates of these four positioning dots and the following coordinate correcting formula to calculate the nominal coordinate of the data dot in the bar code: $x' = k_0 * x + k_1 * x * y + k_2 * y + k_3$; $y' = k_4 * x + k_5 * x * y + k_6 * y + k_7$;

$(x', y')$ is the nominal coordinate of the bar code circular dot, $(x, y)$ is the center coordinate of the dot in the image, inserting the nominal coordinate of the positioning circular dot at the four corners of the bar code and their coordinate of the image in the above formula, calculated linear equations in eight variables, solving the equation to get the result $k_0 \sim k_7$, and then inserting $k_0 \sim k_7$ in the equation to get the coordinate transformation equation, and then inserting the center coordinate of every data dot of the image in this equation, calculated the nominal coordinate of this data dot of this bar code. Because said coordinate transformation puts the positioning origin mapping in the top left corner as the origin of the target rectangle, so the nominal coordinate value of every data dot in the bar code is odd, the coordinate value after transformation needs to be integer to the nearest odd number.

10. Reduction of the Code Word and Error Correction

Figure 13:
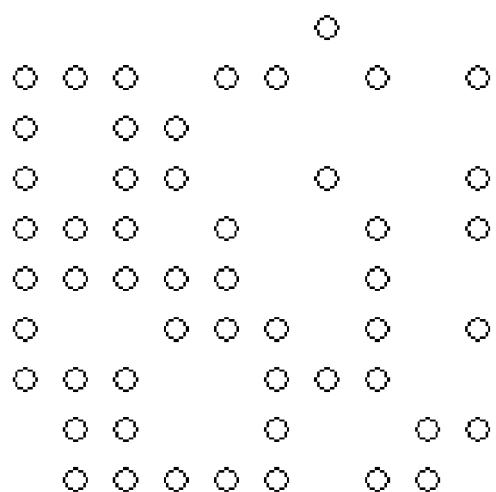
FIG. 13 is the circular dot layout chart of the bar code symbol by decoding reconstruction.

As shown in FIG. 13, code words are recovered from reconstructing data dot matrix obtained in the step 9, according to the inverse process of the codeword layout in the coding process, and the code words obtained from step 8 are corrected by Reed-solomon correcting algorithm and according to decoding parameter corresponding to the coding parameter.

With the development of computer technology and storage technology, publication with words and pictures always accompany with corresponding multimedia audio and video data. Books are divided into several parts according to chapters and at the same time include page numbers, the reader can choose to read different chapters according to the contents of the book; the multimedia audio and video data corresponding to the books also can be divided into some corresponding parts, the reader also can choose the corresponding parts to play according to the index. Also, some publication can pronounce some words or be translated to be another word, this kind of translation and phonetic notation also can be stored by using multimedia methods, and matching with index. Using the two-dimensional code of this invention, the index of this multimedia data can be printed in the corresponding places of the books, for example in the contents of the books, and/or the first page of different chapters in the books, or different places of the page. At the same time the index of this multimedia data can be read by multimedia devices and chosen to the playing paragraph automatically.

The two-dimensional code of this invention used in the publication, printed as the shading of page with the array of code symbol, and other word contents covering the code, thus it is unnecessary to focus on the code symbol when the reading apparatus is reading the code symbol, and the code symbol between lines can always be obtained. In addition, the page typesetting is beautiful.

When the two-dimensional code of this invention is used as the index of the multimedia data, the unified coding method is used to make all kinds of different publication have the unique and unified code. The standard unified code is convenient for the spread and application of the multimedia data publication.

The programming structure of the standard two-dimensional code publication species index coding and multimedia data index coding corresponding to the different parts in the publication includes:

The content of every two-dimensional code all consists of 16-digit decimal number, divided into 6 functional sections, every section has fixed digit number length including: language number, classification number, class index number, page sequence number, code sequence number, error check number.

For example the multimedia index coding information of one publication is as follows:

| Language number | classification number | class index number |
|---|---|---|
| 1 | 10 | 100258 |
| Page sequence number | code sequence number | error check number |
| 0035 | 12 | 9 |

Wherein:

The language number is the language digital code specifically defined for the two-dimensional code complication of the publication, the length of the language number is 1-digit decimal number, indicating Chinese, English, French, German, Russian, Spanish, other languages and 2 candidate languages, respectively represented by number 0, 1, 2, 3, 4, 5, 6, 7, 8, 9.

The classification number is the classification digital code specifically defined for the two-dimensional code complication of the publication, the "classification" is specifically defined according to the book species matching the publication. This period of serial numbers represents the specific classification number of every language. Every classification number is 2-digit decimal number, and the classification of the two-dimensional code is in the range of "00~99".

Class index number is the order representing digit specifically defined for the two-dimensional code complication of the publication. The digit number of every class index number is 6-digit decimal number, compiling numerical number according to the demand of publishing species and sequence, the class index number value range of the two-dimensional code is from 000000 to 999999. Every publication of every species must be given a different class index number.

So, the quantity of language number can be divided into 10, every language kind can be divided into 100 species (classification) numbers, every species can publish 1 million kinds of books. Thus, every language kind supports up to a hundred million kinds of books; and this coding scheme can support 1 billion kinds of publications.

The page sequence number is the page digit marking adopted into the two-dimensional code of the publication. The digit number of every page sequence number is 4-digit decimal number, starting to code the numerical number according to the page sequence of every page from 01. The code sequence number of every two-dimensional code has the value range from 01 to 99. For example when some publication only has one two-dimensional code on page 8, its page sequence number and code sequence number represented as "000801".

The parity check digit is the last number of the publication two-dimensional code compilation to check the correctness of coding.

The value of parity check digit is calculated by the first 5 digits of the decimal numbers of coding, the calculation method is: respectively and in sequence putting the frontal 15 decimal numbers from the multimedia data index of publication as the cardinal number, "1" and "2" as weighted factors, and respectively multiply with decimal number of cardinal number, and then product sum is divided by modulus 10, wherein every section of cardinal number is multiplied with weighted factor, such as $10 \rightarrow 1+0=1$, $16 \rightarrow 1+6=7$, if the product is more than 10, then to add the tens digit of this product with single digit together to get every product sum, when every product sum is less than 10, to add 10 to the product sum and then be divided by modulus 10, and the difference between its remainder and 10 is the value of parity bit. So the value of the parity bit only can be any integer from 1 to 10, when parity bit is 10, it is represented by "0". Therefore, the parity check digit can only be any one of 1234567890.

| | |
|---|---|
| For example: | 1 1 6 0 6 3 4 5 2 0 0 8 6 2 9 (6) |
| | 2 1 2 1 2 1 2 1 2 1 2 1 2 1 2 1 |
| Product: | 1 2 6 0 6 6 4 10 2 0 0 16 6 4 9 |
| Sum of every product: | |

$1 + 2 + 6 + 0 + 6 + 6 + 4 + (1 + 0) + 2 + 0 + 0 +$
$(1 + 6) + 6 + 4 + 9 = 54$
$54 \div 10 = 5.4$
Parity bit: $10 - 4 = 6$
Checking calculation:

$1 + 2 + 6 + 0 + 6 + 6 + 4 + (1 + 0) + 2 + 0 + 0 +$
$(1 + 6) + 6 + 4 + 9 + 6 = 60$
$60 \div 10 = 6$ Reason: when the sum of separate product of parity bit and the frontal 15 value of decimal numbers of coding can be divided by the modulus, the coding is right. So, code 1160634520086296 is a correct publication multimedia index coding.

The characteristic of the publication two-dimensional code compilation structural is that the structure of publication multimedia index coding is 16 bits decimal number and be compiled as two-dimensional code, each section of length is constant digit number, the distribution of every publication multimedia index coding is unique, the compiled two-dimensional code ensures correct reading of MPR reading apparatus or other multimedia playing devices, it is convenient to manage the computer.

For example: when the two-dimensional code of this invention is 1160634520086296, that can be divided into 6 sections according to the order, the language number is 1, the classification number is 16, the class index number is 063452, the page sequence number is 0086, the code sequence number is 29, the parity bit is 6, thus getting 1-16-063452-0086-29-6, so the two-dimensional code compilation is the $29^{th}$ code on page 86 of the $063452^{nd}$ publication with language number 1 and classification number 16.

What is claimed is:

1. A decoding method of a two-dimensional code, wherein code symbols of the two-dimensional code comprise an array of bar code cells with different optical reflectance on a basement; each code symbol is a rectangle, wherein said bar code cells in said symbol are solid dots arranged at equal intervals and the cells located at four corners of said code symbol are four positioning dots for defining and recognizing a border, the rest of the cells are data dots, the size of the said positioning dots is larger than that of said data dots; wherein a plurality of said code symbols are arranged repeatedly on the basement so as to be seamlessly jointed as a code matrix, including at least two identical code symbols, wherein adjacent code symbols in the code matrix share same positioning dots on their adjacent border, wherein said data dots are all within the rectangle defined by linking said positioning dots' centers, wherein the diameter of said positioning dots is twice that of said data dots, and wherein said code symbol includes 10×10 bar code cells, wherein except the positioning dots, every adjacent 8 data dots constitute a group to represent one code word; the coordinates of said positioning dots are respectively (0,0),(9,0),(0,9) and (9,9); in a chessboard coordinate system defined by coordinates of the positioning dots, the data dots are divided into 12 groups that respectively represent one code word; unit coordinates of a first group include (1,0), (2,0), (0,1), (1,1), (2,1), (0,2), (1,2), (2,2); unit coordinates of a second group include (3,0), (4,0), (5,0), (6,0), (3,1), (4,1), (5,1), (6,1); unit coordinates of a third group include (7,0), (8,0), (7,1), (8,1), (9,1), (7,2), (8,2), (9,2); unit coordinates of a forth group include (3,2), (4,2), (2,3), (3,3), (4,3), (2,4), (3,4), (4,4); unit coordinates of a fifth group include (5,2), (6,2), (5,3), (6,3), (7,3), (5,4), (6,4), (7,4); unit coordinates of a sixth group include (0,3), (1,3), (0,4), (1,4), (0,5), (1,5), (0,6), (1,6); unit coordinates of a seventh group include (8,3), (9,3), (8,4), (9,4), (8,5), (9,5), (8,6), (9,6); unit coordinates of an eighth group include (2,5), (3,5), (4,5), (2,6), (3,6), (4,6), (3,7), (4,7); unit coordinates of a ninth group include (5,5), (6,5), (7,5), (5,6), (6,6), (7,6), (5,7), (6,7); unit coordinates of a tenth group include (0,7), (1,7), (2,7), (0,8), (1,8), (2,8), (2,9), (3,9); unit coordinates of an eleventh group include (3,8), (4,8), (5,8), (6,8), (3,9), (4,9), (5,9), (6,9); unit coordinates of a twelfth group include (7,7), (8,7), (9,7), (7,8), (8,8), (9,8), (7,9), (8,9), wherein
said decoding method comprises the following steps:
1) reading the code symbols by using a reading device to get a gray code symbol image;
2) binarizing the gray code symbol image to get a binary image;
3) parsing the binary image, detecting the margin of each dot to obtain the dot images having a margin;
4) parsing the dot image having the margin to track their closed borders and discarding all non-closed borders to obtain an image of the closed borders;
5) parsing the image of the closed borders, computing an area within every closed border in order to select the positioning dots;
6) matching the positioning dots in a rectangle mode to select one single image of the code symbol;
7) grouping the data dots from the image of the code symbols;
8) reconstructing a matrix of data dots; and
9) reducing codes according to an inverse process of codes layout in a coding process of the two-dimensional code.

2. The method according to claim 1, wherein the process of selecting positioning dots in said step 5) includes:
51) computing an area within every closed border so as to count an area histogram within all closed borders and finding a most concentrated area value $S_0$ from the area histogram;
52) defining the closed borders whose area is around $S_0$ and in compliance with a regulated error range as the data dots; and defining the closed borders having an area of a known multiple of $S_0$ and in compliance with a regulated error range as the positioning dots.

3. The method according to claim 1, wherein when the known bar code cells are circular dots, the method further includes, before the step 5, step 5') a process of recognizing the circular dots, comprising:
51') adding the pixel abscissa of all the border dots of each closed border, and then dividing the cumulative total of the pixel abscissa by the sum of border points to get the pixel abscissa u of the center point of the closed border; adding the pixel ordinate of all the border points, and then dividing the cumulative total of the pixel ordinate by the sum of border points to get the pixel ordinate v of the center dot of the closed border;
52') according to the pixel coordinates (u, v) of the center dot of the closed border, finding the diameter of the closed border in four directions to get four length values respectively d1, d2,d3,d4;
53') calculating the average diameter d=(d1+d2+d3+d4)/4, and defining the round's standard degree N=|d−d1|/d+|d−d2|/d+|d−d3|/d+|d−d4|/d;
54') calculating the value N of each closed border, discarding the closed borders having a value N greater than the setting threshold value $T_n$ according to actual statistic results, and considering the rest of the closed borders was considered as the borders of bar code circular dot.

4. The methods according to claim 1, wherein the process of matching the positioning dot in the rectangle mode in the said step 6) includes:
61) choosing the closest positioning dot to the center of image as a first reference dot;
62) choosing the other closest positioning dot to the first reference dot as a second reference dot;
63) using the side defined by the two reference dots as a reference border of a target rectangle, the first reference dot as the origin, and calculating the second reference dot's polar coordinate ($r_0$, $\theta_0$);
64) calculating the rest of the positioning dots' polar coordinates ($r_i$, $\theta_i$) relative to the first reference dot's polar coordinates, i∈[1~n], wherein n is the sum of positioning dot;
65) using the first reference dot as a center, relative to the reference side, calculating the polar coordinates of the other positioning dots of four rectangles of possible four code symbols;

$P_1=(r_0,\theta_0)$, $P_2=(r_0*1.414,\theta_0+45), P_3=(r_0*1,\theta_0+90)$ $P_4=(r_0*1.414,\theta_0+135)$ $P_5=(r_0*1,\theta_0+180)$ $P_6=(r_0*1.414,\theta_0+225)$ $P_7=(r_0*1,\theta_0+270)$ $P_8=(r_0*1.414,\theta_0+315)$ wherein: $P_0$ is the first reference dot, $P_1$ is the second reference dot, the angle of all the polar coordinates is in [0,360];
66) finding the matching polar coordinates from $P_1$ to $P_8$ in the calculation result of Step 64), determining if the matching of dots $P_0$, $P_1$ and $P_2$, $P_3$ will compose the first target rectangle, if the matching is not successful, then determining if the matching of dots $P_0$ and $P_3$, $P_4$ and $P_5$ will compose the second target rectangle, if still not successful, then determining if the matching of dots $P_0$ and $P_5$, $P_6$ and $P_7$ will compose the third target rectangle, if not successful again, then determining if the matching of dots $P_0$, $P_1$ and $P_8$, $P_7$ will compose the fourth target rectangle; if still can not be matched, then the decoding is failed fails.

5. The method according to claim 1, wherein the grouping process of the data dots in the said step 7) includes:
71) defining a closed quadrilateral according to the coordinates of four positioning dots, and
72) judging whether the data dots are within the quadrilateral or not, and the data dots within the quadrilateral belonging to the current code symbol.

6. The said method according to claim 1, wherein the process of reconstructing the data dots' matrix in said step 8) includes: 81) setting unit module coordinates of four positioning dots, and then setting chessboard coordinates of each bar code cell; and 82) according to coordinate correcting formula, calculating the corresponding coordinates of the bar code chessboard according to the center coordinates of each data dot.

7. The method according to claim 5, wherein the method of judging whether one dot is within the quadrilateral or not of the said step 72) includes: respectively judging whether one dot is within the two groups of corresponding sides of the quadrilateral or not; if yes, this dot being within the quadrilateral; if no, this dot being not within the quadrilateral; setting the linear equation of the two sides: $y=k_1*x+b_1$; $y=k_2*x+b_2$; the condition of dot $(x_0, y_0)$ within the two sides: $(k_1*x_0+b1-y_0)*(k_2*x_0+b_2-y_0)<0$.

\* \* \* \* \*